United States Patent
Okazaki et al.

(10) Patent No.: US 8,666,221 B2
(45) Date of Patent: Mar. 4, 2014

(54) IMAGING APPARATUS

(75) Inventors: Yoshinori Okazaki, Osaka (JP);
Yasutoshi Yamamoto, Osaka (JP);
Akira Seto, Osaka (JP); Tsutomu Mukai, Osaka (JP)

(73) Assignee: Panasonic Corporation, Osaka (JP)

( * ) Notice: Subject to any disclaimer, the term of this patent is extended or adjusted under 35 U.S.C. 154(b) by 126 days.

(21) Appl. No.: 13/353,432

(22) Filed: Jan. 19, 2012

(65) Prior Publication Data
US 2012/0189265 A1    Jul. 26, 2012

(30) Foreign Application Priority Data
Jan. 21, 2011    (JP) .................. 2011-010404

(51) Int. Cl.
*H04N 5/77*    (2006.01)
(52) U.S. Cl.
USPC ........................... 386/227; 386/224; 386/228
(58) Field of Classification Search
USPC .......................................... 386/224, 227–228
See application file for complete search history.

(56) References Cited

U.S. PATENT DOCUMENTS

| | | | | |
|---|---|---|---|---|
| 5,526,045 A | * | 6/1996 | Oshima et al. | 348/208.5 |
| 5,994,701 A | * | 11/1999 | Tsuchimoto et al. | 250/351 |
| 7,151,565 B1 | * | 12/2006 | Wada et al. | 348/231.6 |
| 2007/0285542 A1 | * | 12/2007 | Suzuki | 348/294 |
| 2009/0112506 A1 | * | 4/2009 | Kazama | 702/130 |

FOREIGN PATENT DOCUMENTS

| | | |
|---|---|---|
| JP | 2004-248059 | 9/2004 |
| JP | 2005-12302 | 1/2005 |
| JP | 2007-28425 | 2/2007 |
| JP | 2007-300607 | 11/2007 |
| JP | 2009-170956 | 7/2009 |

* cited by examiner

*Primary Examiner* — Helen Shibru
(74) *Attorney, Agent, or Firm* — Panasonic Patent Center

(57) ABSTRACT

An imaging apparatus includes a temperature sensor configured to sense a temperature associated with a case of the imaging apparatus, a moving image recording unit configured to generate moving image data based on one of a plurality of recording methods which determines image quality of a recording image, and records the moving image data in a recording medium, and a controller configured to control the recording method set on the moving image recording unit. The controller changes the recording method to be set on the moving image recording unit, according to a result of the sensing by the temperature sensor.

8 Claims, 10 Drawing Sheets

Fig. 5

| | MODE | MODE CONDITION | | RISE RATE IN CASE TEMPERATURE |
|---|---|---|---|---|
| HIGH QUALITY ↕ LOW QUALITY | FIRST MOVING IMAGE RECORDING MODE | FHD | 60 p | RISE ↖ |
| | SECOND MOVING IMAGE RECORDING MODE | FHD | 60 i | SLIGHTLY RISE ↗ |
| | THIRD MOVING IMAGE RECORDING MODE | HD | 60 p | SLIGHTLY DOWN ↗ |
| | FOURTH MOVING IMAGE RECORDING MODE | HD | 30 p | DOWN ↘ |

IMAGING APPARATUS

BACKGROUND

1. Technical Field

The technical field relates to an imaging apparatus and more particularly to an imaging apparatus capable of recording moving images.

2. Related Art

A digital camera equipped with an imaging sensor that captures a subject image formed through an optical system to generate image data has become widespread. The imaging sensor consumes power to perform various processing operations for generating image data. The imaging sensor generates heat when performing the various processing operations. In particular, when operation is performed continuously for a long period of time such as when a moving image recording process is performed, a rise in temperatures of the imaging sensor and an image processing engine becomes more significant due to heat generation.

Such a temperature rise inside the imaging apparatus may cause problems such as significant noise included in an output from the imaging sensor, trouble in user's holding a camera case, and deformation of a camera body or components. In recent years, with miniaturization of digital cameras, measures against heat generation of an imaging sensor have become an issue.

There is known a digital camera that, as measures against heat generation of an imaging sensor, provides a warning or limits a camera recording operation when a temperature sensed by a temperature sensor exceeds an allowable temperature. For example, JP2007-28425A discloses an art to perform control to stop a moving image recording operation which is an operation with high consumed power among operations of a digital camera and enable a still image recording operation with a low consumed power among the operations of the digital camera when a temperature measured by a temperature sensor exceeds an allowable temperature (70 degrees).

According to the art disclosed in JP2007-28425A, in a case when a user is recording a scene that the user wants to continuously record the moving image for a long period of time, when a temperature higher than the allowable temperature is sensed by the temperature sensor, the moving image recording operation is suddenly stopped. With this, the user can not record an important scene, which is inconvenient for the user.

To solve the above problem, an imaging apparatus is provided which enables continuously recording of a moving image as long as possible even if a measured temperature in the imaging apparatus rises.

SUMMARY

In a first aspect, an imaging apparatus is provided. The imaging apparatus includes a temperature sensor configured to sense a temperature associated with a case of the imaging apparatus, a moving image recording unit configured to generate moving image data based on one of a plurality of recording methods which determines image quality of a recording image, and records the moving image data in a recording medium, and a controller configured to control the recording method set on the moving image recording unit. The controller changes the recording method to be set on the moving image recording unit, according to a result of the sensing by the temperature sensor.

According to the above aspect, by controlling a moving image recording method (moving image recording mode) taking into account the temperature in the case of the imaging apparatus, even if the temperature in the case rises, the moving image recording can be continuously performed as long as possible.

BRIEF DESCRIPTION OF DRAWINGS

FIG. 5 is a diagram for describing a rate of temperature rise for setup moving image recording modes.

DETAILED DESCRIPTION OF PREFERRED EMBODIMENTS

Embodiments will be described below with reference to the accompanying drawings.

First Embodiment

A digital camera described below senses a temperature associated with a case of the digital camera and changes, according to a result of sensing of the temperature, a moving image recording mode to be set, automatically or according to a user's instruction. This arrangement enables the digital camera to continue moving image recording as long as possible, even if a temperature measured inside the camera rises.

1. Configuration

A configuration of a digital camera of the present embodiment will be described below using the drawings.

1-1. Configuration of Digital Camera

Figure 1:
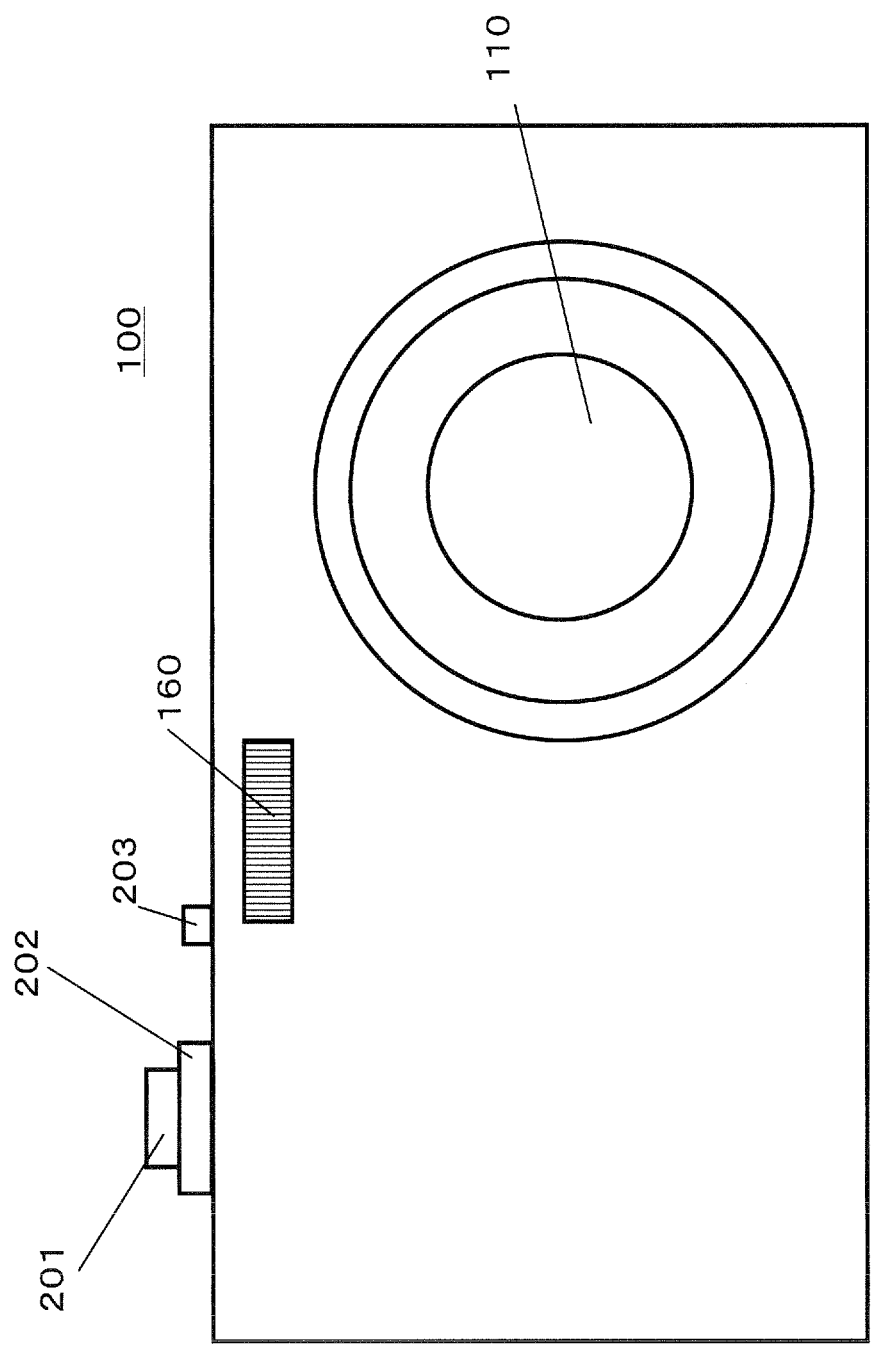
FIG. 1 is a front view of a digital camera.

FIG. 1 is a front view of a digital camera 100 of the present embodiment. The digital camera 100 has, at the front face thereof, a lens barrel that contains an optical system 110, and a flash 160. In addition, the digital camera 100 has, at the top face thereof, operation buttons such as a release button 201, a zoom lever 202, and a power supply 203.

Figure 2:
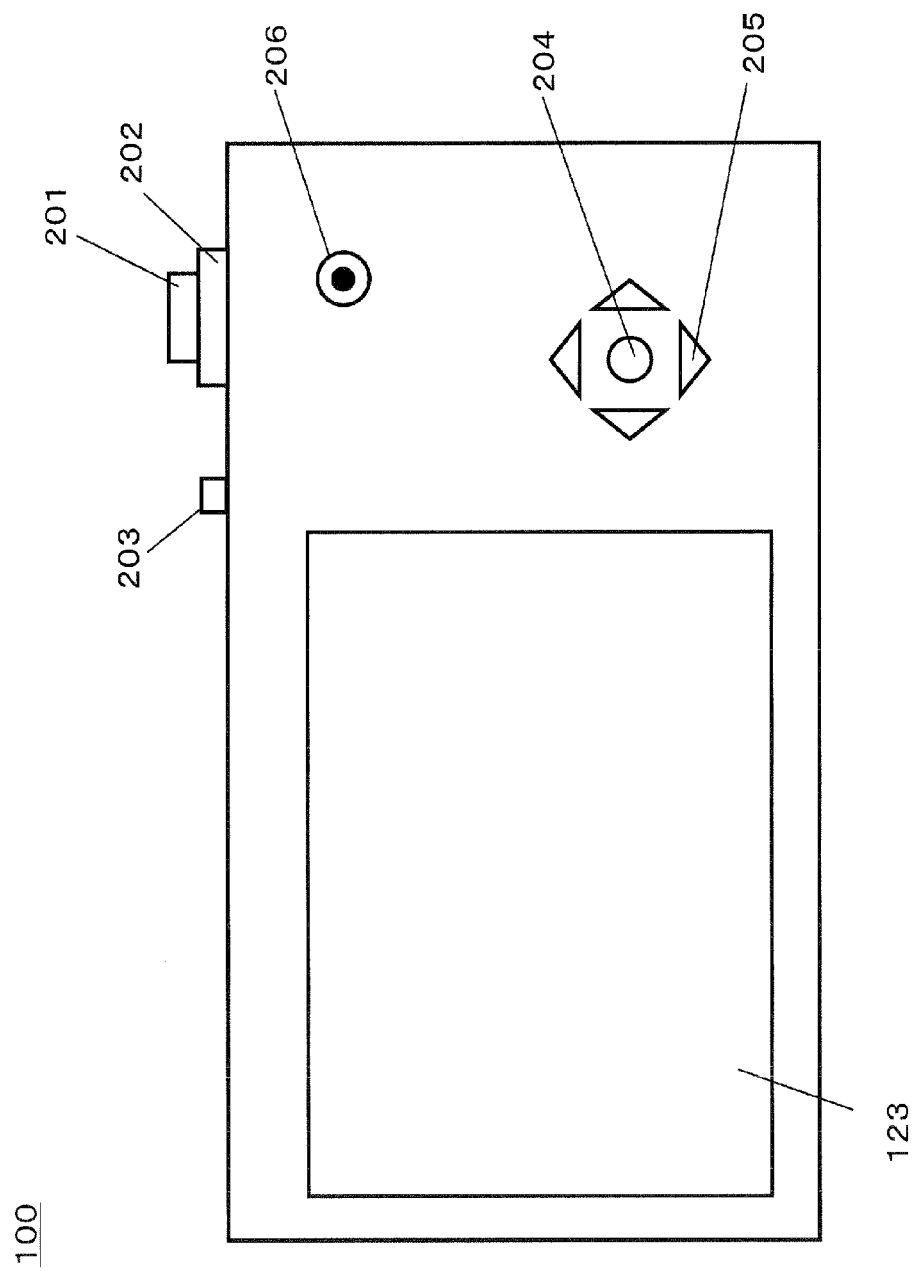
FIG. 2 is a back view of the digital camera.

FIG. 2 is a back view of the digital camera 100. The digital camera 100 has, at the back face thereof, a liquid crystal display monitor 123 and operating buttons such as a moving image recording button 206, a center button 204, and a cross button 205.

Figure 3:
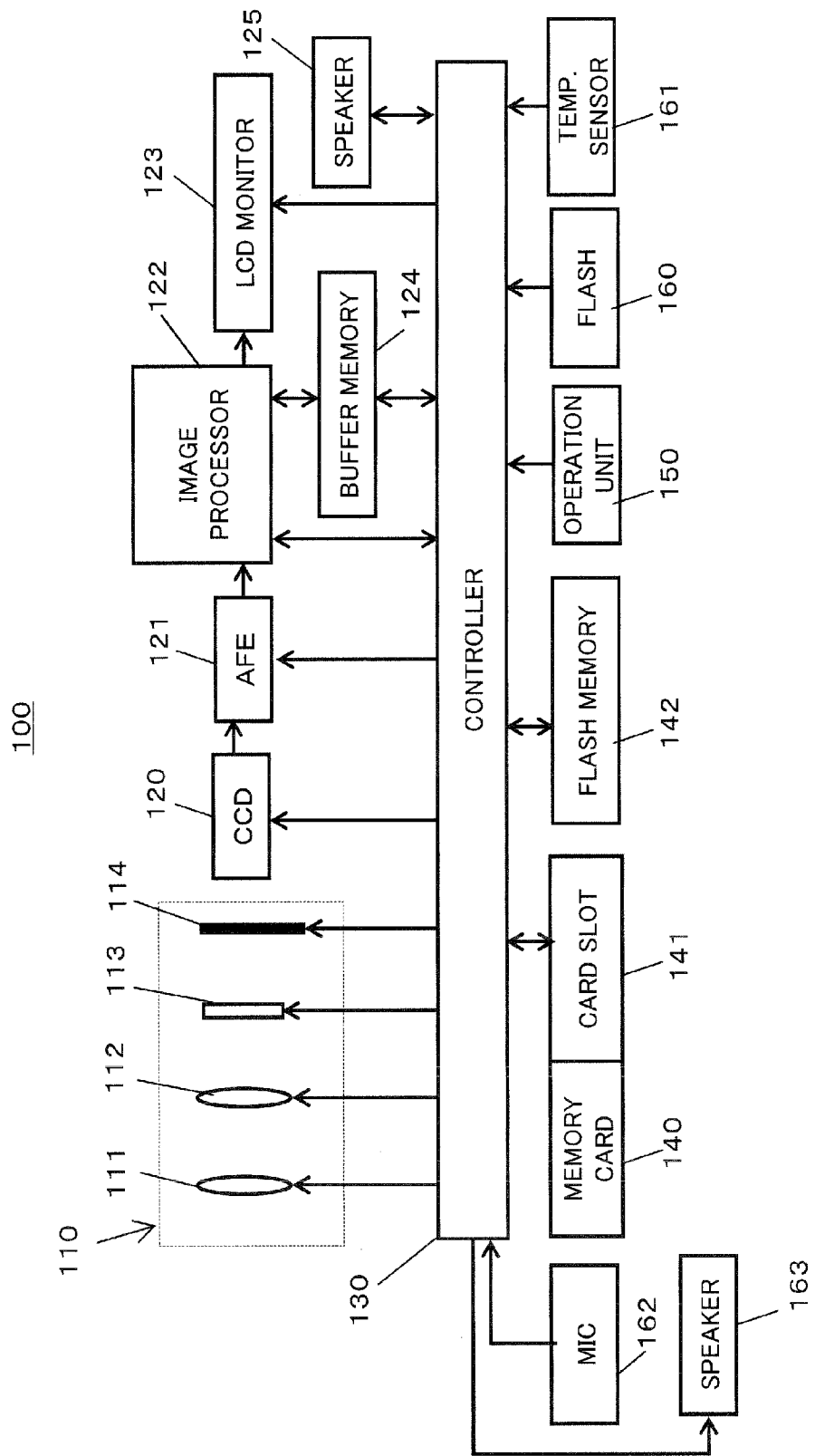
FIG. 3 is an electrical configuration diagram of the digital camera.

FIG. 3 is an electrical configuration diagram of the digital camera 100. The digital camera 100 captures, with a CCD image sensor 120, a subject image formed through the optical system 110. The CCD image sensor 120 generates image information based on the captured subject image. The image information generated by the CCD image sensor 120 is subjected to various processes in an AFE (Analog Front End) 121 and an image processor 122. The image information subjected to various processes is recorded in a flash memory 142 or a memory card 140. The image information recorded in the flash memory 142 or the memory card 140 is displayed on the liquid crystal display monitor 123 according to an operation performed on an operation unit 150 by a user. Details of the configurations shown in FIGS. 1 to 3 will be described below.

The optical system 110 includes a focus lens 111, a zoom lens 112, a diaphragm 113, a shutter 114, and the like. The optical system 110 may include an optical camera shake correction lens (OIS: Optical Image Stabilizer) (not shown). Each of lenses included in the optical system 110 may be realized in any number of lenses or any number of lens groups.

The focus lens 111 is used to adjust focus state of a subject. The zoom lens 112 is used to adjust an angle of view of a subject. The diaphragm 113 is used to adjust amount of light incident on the CCD image sensor 120. The shutter 114 adjusts the exposure time of light incident on the CCD image sensor 120. The focus lens 111, the zoom lens 112, the diaphragm 113, and the shutter 114 are driven by the respective drivers such as DC motors or stepping motors, according to control signals provided from a controller 130.

The CCD image sensor 120 captures a subject image formed through the optical system 110 and generates image information. The CCD image sensor 120 has multiple photodiodes arranged two-dimensionally on its light-receiving plane. In addition, color filters of primary colors R, G, and B are arranged corresponding to the respective photodiodes in a predetermined arrangement. Light from a subject to be recorded passes through the optical system 110, is imaged on the light-receiving surface of the CCD image sensor 120, and is converted into an electrical signal indicating image information. Then the electrical signal is supplied to the subsequent AFE 121.

In addition, the CCD image sensor 120 operates based on some drive modes associated with operation modes of the digital camera 100. The operation modes of the digital camera 100 include a playback mode and a recording mode. The recording mode includes a still image recording operation mode, a moving image recording operation mode, a through image recording operation mode and the like.

The AFE 121 performs noise suppression with correlated double sampling, gain multiplication based on an ISO sensitivity with an analog gain controller, and AD conversion with an AD converter, on the image information inputted from the CCD image sensor 120. Thereafter, the AFE 121 outputs the image information to the image processor 122.

The image processor 122 performs various processes on the image information outputted from the AFE 121. The various processes include, for example, adding up of BMs (block memories), smear correction, white balance correction, gamma correction, a YC conversion process, an electronic zoom process, a compression process, and a decompression process, but are not limited thereto. The image processor 122 may be composed of a hard-wired electronic circuit or a microcomputer using a program, etc. Alternatively, the image processor 122 may be made in a single semiconductor chip together with other functional units such as the controller 130.

A temperature sensor 161 measures a temperature associated with or of a case of the digital camera 100. Then, the temperature sensor 161 notifies the controller 130 of a measurement of the temperature of the case. Now, the temperature associated with the case of the digital camera 100 will be described.

Figure 4:
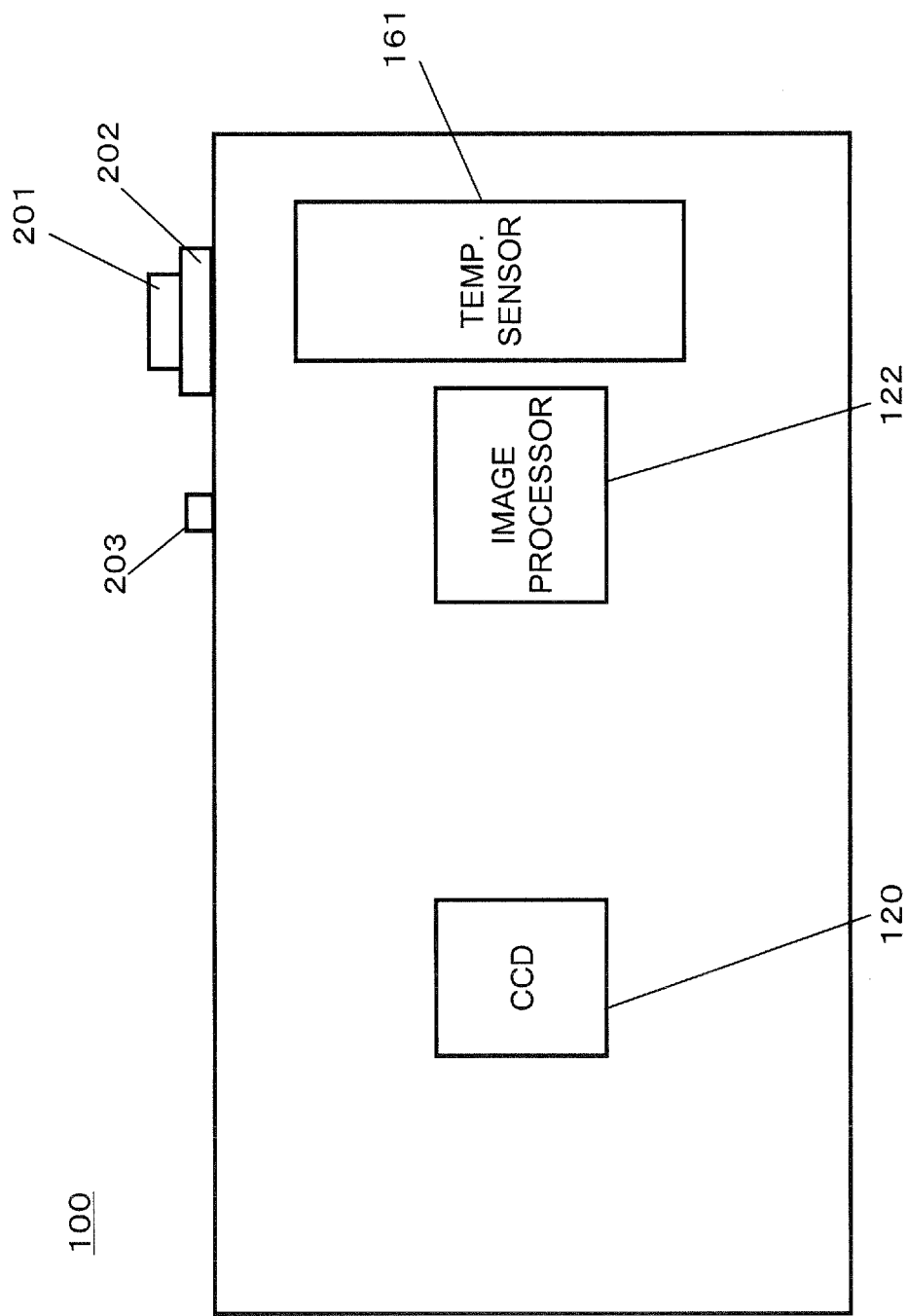
FIG. 4 is a diagram showing an internal configuration of the digital camera.

FIG. 4 is a diagram of an internal configuration of the digital camera 100 as viewed from the back face thereof. As shown in FIG. 4, the CCD image sensor 120 is disposed at a location corresponding to the optical system 110. In addition, though not shown in FIG. 4, a card slot 141 and a battery case (not shown) are disposed on the right side of the digital camera 100 as viewed from the back face thereof, and the image processor 122 is disposed at a location facing the card slot 141 and the battery case. In addition, the temperature sensor 161 is disposed in a grip portion used by the user to hold the digital camera 100. When a state in which the CCD image sensor 120 and the image processor 122 operate continuously for a long time such as during moving image recording, the CCD image sensor 120 and the image processor 122 generate heat. Correspondingly, the temperature of the case of the digital camera 100 rises. Heat generating members such as the CCD image sensor 120 and the image processor 122 are disposed at locations roughly symmetrical with respect to the center in a horizontal direction of the case. Hence, the temperature distribution in the case of the digital camera 100 is roughly bilaterally symmetrical. Upon shooting an image, the user often holds the left and right edge portions of the digital camera 100 with both hands. Thus, it can be estimated that when the temperature sensor 161 is disposed in either one of the left and right grips in the case of the digital camera 100, an equivalent result of measurement is also obtained for the other one. In the first embodiment, assuming the case in which shooting is performed by the user holding the digital camera 100 with one hand, the temperature sensor 161 is disposed in a grip on the right hand side where operating members such as the release button 201 and the zoom lever 202 are disposed.

The liquid crystal display monitor 123 is provided on the back face of the digital camera 100. The liquid crystal display monitor 123 displays an image created based on the image information processed by the image processor 122. Images to be displayed on the liquid crystal display monitor 123 include a through image and a recorded image. The through image is an image obtained by continuously displaying frame images which are created every certain period of time by the CCD image sensor 120. Normally, when the digital camera 100 is in the recording mode, the image processor 122 creates a through image from image information generated by the CCD image sensor 120. By seeing a through image displayed on the liquid crystal display monitor 123, a user can shoot an image while checking a composition of an image. The recorded image is an image obtained by resizing a moving image of high pixel size or a still image of high pixel size recorded in the memory card 140, etc., to an image of low pixel size to display the image on the liquid crystal display monitor 123, when the digital camera 100 is in the playback mode.

The controller 130 controls the entire operation of the digital camera 100. The controller 130 may be composed of a hard-wired electronic circuit, a microcomputer, or the like. Alternatively, the controller 130 may be made in a single semiconductor chip together with the image processor 122, etc.

The flash memory 142 functions as an internal memory for recording image information and the like. In addition, the flash memory 142 stores therein programs for performing overall control of the entire operation of the digital camera 100, in addition to programs relating to autofocus control (AF control), automatic exposure control (AE control), and light emission control of the flash 160. In addition, the flash memory 142 stores therein association information between setup moving image recording modes and a temperature rise rate, as shown in FIG. 5. The controller 130 can recognize a temperature rise rate for a moving image recording mode to be set, by accessing the flash memory 142.

A buffer memory 124 is storage means that functions as a working memory for the image processor 122 and the controller 130. The buffer memory 124 can be realized by a DRAM (Dynamic Random Access Memory) and the like.

The card slot 141 is connection means that allows the memory card 140 to be inserted therein and removed therefrom. The card slot 141 allows the memory card 140 to be electrically and mechanically connected thereto. In addition, the card slot 141 may have a function of controlling the memory card 140. The memory card 140 is an external memory including a storing unit such as a flash memory. The memory card 140 can record data such as image information processed by the image processor 122.

A microphone 162 collects sounds around the digital camera 100 to convert the sounds into an electrical signal indicating audio information. The audio information converted into the electrical signal is recorded in the memory card 140. The microphone 162 operates when the digital camera 100 is set to an audio recording mode or a moving image recording mode. The microphone 162 is disposed on the top of the digital camera 100 (not shown), but the location thereof is not limited thereto.

A speaker 163 converts the audio information recorded in the memory card 140 into human-audible sound and emits the sound. The speaker 163 operates when playing back audio information or moving image information recorded in the memory card 140 in the playback mode. The speaker 163 is disposed on the top of the digital camera 100 (not shown), but the position is not limited thereto.

The operation unit 150 is a collective term for operation buttons and an operation lever provided on the exterior of the digital camera 100, and receives operations performed by the user. The operation unit 150 includes, for example, the release button 201, the zoom lever 202, the power button 203, the center button 204, the cross button 205, and the moving image recording button 206 which are shown in FIGS. 1 and 2. Upon receipt of operations performed by the user, the operation unit 150 sends various operation command signals to the controller 130.

The release button 201 is a button to be pressed that can take two states: a half-pressed state and a full-pressed state. When the release button 201 is half-pressed by the user, the controller 130 performs auto focus (AF) control and auto exposure (AE) control to determine a recording condition. Then, when the release button 201 is full-pressed by the user, the controller 130 records, as a still image, image information generated by the CCD image sensor 120 at the timing of the full-press, in the memory card 140 and the like.

The zoom lever 202 is a lever that has a wide-angle end and a telephoto end for view angle adjustment and can return to a central position by itself. When the zoom lever 202 is operated by the user, the zoom lever 202 sends an operation command signal for driving the zoom lens 112 to the controller 130. Specifically, when the zoom lever 202 is operated to the wide-angle end, the controller 130 drives the zoom lens 112 to zoom out a subject. Likewise, when the zoom lever 202 is operated to the telephoto end, the controller 130 drives the zoom lens 112 to zoom in a subject.

The power button 203 is a button to be pressed for turning on/off of supplying of power to each unit included in the digital camera 100. When the power button 203 is pressed by the user with the digital camera powered off, the controller 130 supplies power to each unit included in the digital camera 100 to activate them. When the power button 203 is pressed by the user with the digital camera 100 powered on, the controller 130 stops the supplying of power to each unit.

The moving image recording button 206 is a button to be pressed. When the moving image recording button 206 is pressed while the digital camera 100 is in the recording mode and is in a recording standby state in which the liquid crystal display monitor 123 displays a through image, the controller 130 starts a moving image recording operation. When the moving image recording operation starts, the CCD image sensor 120 and the image processor 122 generate moving image information according to a specified moving image recoding mode. In addition, at this time, the microphone 162 collects sounds to generate audio information. Then, the image processor 122 performs a multiplexing process on the generated moving image information and audio information according to a predetermined moving image recording format to generate moving image information with sound. The controller 130 continuously records moving image information with sound to be generated, in the memory card 140. When the moving image recording button 206 is pressed while the digital camera 100 is in a moving image recording state, the controller 130 terminates the moving image recording operation.

The center button 204 is a button to be pressed. When the center button 204 is pressed by the user while the digital camera 100 is in the recording mode or the playback mode, the controller 130 displays a menu screen on the liquid crystal display monitor 123. The menu screen is a screen for setting various conditions for recording/playback of images. When the center button 204 is pressed with a setting item for various conditions being selected, the center button 204 also functions as a set button.

The cross button 205 is a button to be pressed in left, right, up, or down direction. The user can make a selection from among various items displayed on the liquid crystal display monitor 123 by pressing the cross button 205 in one of directions.

1-2. Moving Image Recording Mode

The digital camera 100 of the present embodiment has a plurality of moving image recording modes for setting the image quality and size of a moving image to be recorded. A moving image recording mode can be specified (set) by the user through the operation unit 150. Upon a moving image recording operation, the controller 130 sets a moving image recording mode for setting the image quality and size of a moving image to be recorded, which is specified through the operation unit 150, on the CCD image sensor 120 and the image processor 122. A plurality of moving image recording modes are prepared, including a first moving image recording mode which enables moving image recording with high image quality to a fourth moving image recording mode which enables moving image recording with low image quality. FIG. 5 is a diagram for describing temperature rise rates in the case for the respective moving image recording modes. Note that FIG. 5 shows a relationship between each moving image recording mode and a rate of temperature rise of the case when the digital camera 100 is continuously operated in the moving image recording mode with the case of the digital camera 100 being at a predetermined reference temperature (e.g., a temperature higher than ambient temperature (e.g., 27° C.)).

In a first moving image recording mode, the CCD image sensor 120 outputs an image of full high-definition size (1920 dots×1080 dots) with 60 frames per second in a progressive scheme. Then, the image processor 122 performs a compression process on the output image.

In a second moving image recording mode, the CCD image sensor 120 outputs an image of full high-definition size with 60 frames per second by a progressive scheme. Then, the image processor 122 performs a thinning-out process on the output image according to an interlaced scheme and thereafter performs a compression process on the image.

In a third moving image recording mode, the CCD image sensor 120 outputs an image of high-definition size (1280 dots×720 dots) with 60 frames per second by a progressive scheme. Then, the image processor 122 performs a compression process on the output image.

In a fourth moving image recording mode, the CCD image sensor 120 outputs an image of high-definition size with 30 frames per second by a progressive scheme. Then, the image processor 122 performs a compression process on the output image.

In the modes in which a moving image can be recorded with higher image quality, load of processing in the CCD image sensor 120 and the image processor 122 are high, and thus amount of generated heat is large, so that a rate of temperature rise inside the case of the digital camera 100 becomes higher. In the modes in which a moving image is recorded with lower image quality, the load of processing in the CCD image sensor 120 and the image processor 122 are lower so that amount of generated heat is smaller and the temperature rise rate in the case has a negative value. When an operation continues in the modes in which moving image is recorded with low image quality, the temperature in the case tends to drop from the reference temperature.

Namely, in the first moving image recoding mode, although moving image recording can be performed with high image quality, the temperature rise rate in the case is high. In the second moving image recording mode, a compression process is performed on an output image subjected to a thinning-out process, and thus the load in the compression process performed by the image processor 122 is reduced compared to the first moving image recoding mode. Hence, the temperature rise rate in the case is slightly lower than that in the first moving image recording mode. In the third moving image recording mode, a size of the output image is smaller than that in the first and second moving image recording modes, the load of the outputting operation of the CCD image sensor 120 and the load of processing of the image processor 122 are reduced so that the temperature rise rate in the case tends to be slightly down compared to the first and second moving image recording modes. The fourth moving image recording mode is for a moving image recording with low image quality, and thus the output frame rate is lower than those in other moving image recording modes. Hence, the load of outputting operation of the CCD image sensor 120 and the load of compression processing of the image processor 122 are further reduced and thus the temperature rise rate in the case tends to be in down. Note that the relationship between the moving image recording modes and the temperature rise rates as shown in FIG. 5 is an example and thus, needless to say, such a relationship changes depending on the case size of the digital camera 100, the specification of the CCD image sensor 120 and the image processor 122 and the like. In the present embodiment, the following description is made based on the relationship as shown in FIG. 5. Note that a desired moving image recording mode may be set by a user in advance on the controller 130 before starting a moving image recording operation.

In the first and second moving image recording modes, the temperature rise rate is relatively high. Hence when a moving image recording operation is performed continuously in those modes in a normal operating environment, the temperature in the case continues to rise and eventually reaches a predetermined threshold temperature (recording stop temperature). On the other hand, in the third and fourth moving image recording modes, the temperature rise rate is relatively low. Hence, even if a moving image recording operation is performed continuously in those modes, the temperature in the case does not reach the predetermined threshold temperature (recording stop temperature). As used herein, the recording stop temperature refers to a temperature at which the controller 130 performs control to forcibly stop a recording operation (the details will be described later). That is, the moving image recording modes are classified into a mode with a high temperature rise rate, i.e., a mode in which the temperature in the case rises when a moving image recording operation is performed continuously in that mode (the first and second moving image recording modes), and a mode with a low temperature rise rate, i.e., a mode in which the temperature in the case does not rise when a moving image recording operation is performed continuously in that mode (the third and fourth moving image recording modes).

A moving image recording mode is set according to an instruction provided by the user through the operating unit 150, or is automatically set by the controller 130.

1-3. Correspondence of Terms

The temperature sensor 161 is an example of a temperature sensor. The CCD image sensor 120, the image processor 122, and the controller 130 are examples of a moving image recording unit. The memory card 140 is an example of a recording medium. The liquid crystal display monitor 123 is an example of a display unit. The controller 130 is one of examples of a calculation unit, a display controller or recording controller, and a recording stopping unit. The digital camera 100 is an example of an imaging apparatus.

2. Operation

Figure 6:
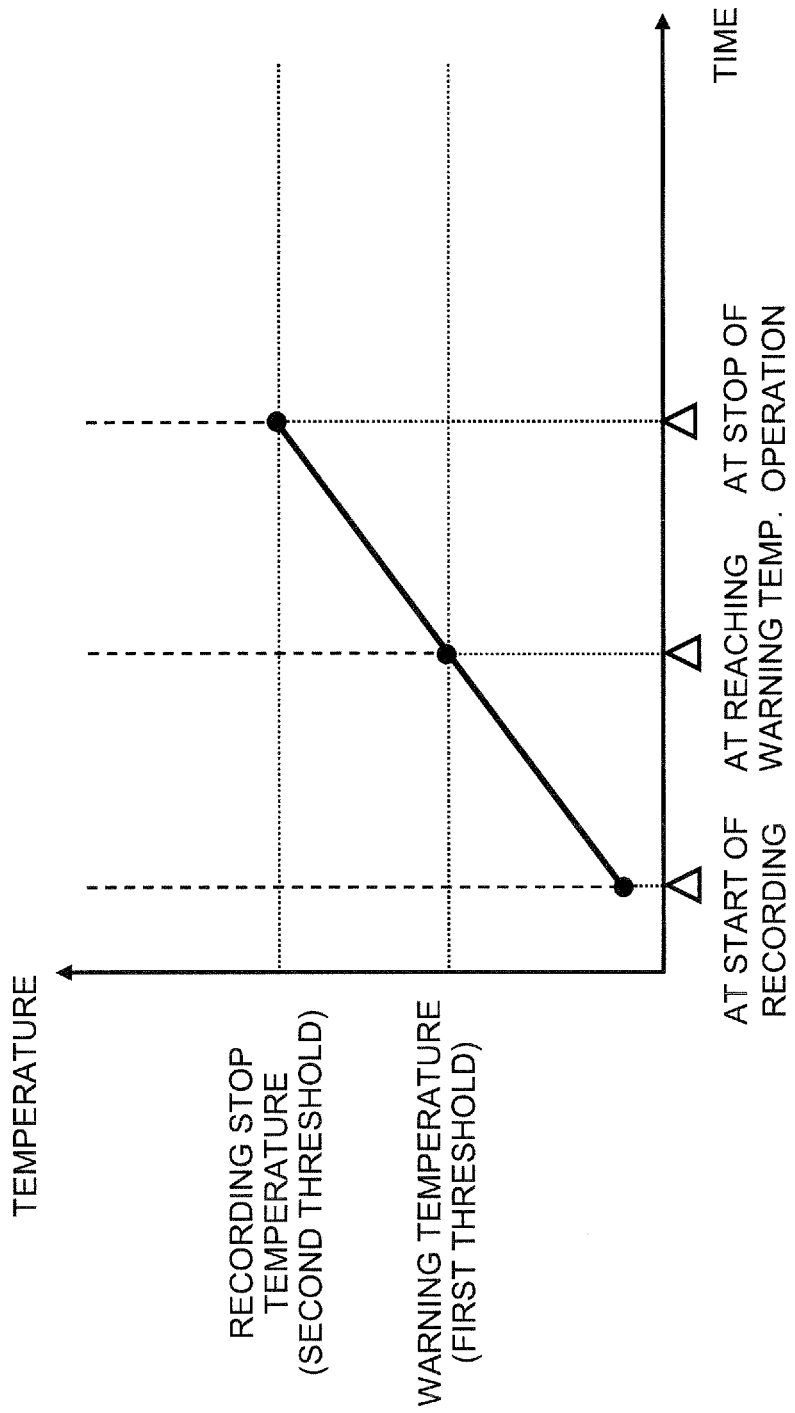
FIG. 6 is a diagram for describing a control performed when the temperature rises as time elapses.

A control operation performed when the temperature rises along with elapse of time during a moving image recording in the digital camera 100 of the present embodiment will be described. FIG. 6 is a diagram for describing control performed when the temperature rises along with elapse of time. In FIG. 6, a horizontal axis indicates the elapse of time and a vertical axis indicates temperature rise.

The controller 130 predetermines a warning temperature (first threshold value) and a recording stop temperature (second threshold value) as threshold values for temperature. The recording stop temperature (second threshold value) is a temperature serving as a criterion for determining whether to forcibly stop moving image recording in order to avoid trouble, which is caused by a temperature rise, in terms of control or operation of the digital camera 100. The warning temperature (first threshold value) is a temperature serving as a criterion for determining whether to provide a warning informing that the temperature soon reaches the recording stop temperature.

When a moving image recording operation starts, the temperature in the case of the digital camera 100 rises due to heat generation of the CCD image sensor 120 and the image processor 122. The temperature in the case eventually exceeds the warning temperature and reaches the recording stop temperature (second threshold value). At this time, even if the user is shooting a moving image, the controller 130 forcibly stops the moving image recording.

However, when the user is shooting a moving image of a scene which the user wants to record continuously a moving image for a long period of time, if the moving image recording operation is stopped due to a temperature measured by the temperature sensor 161 exceeding an allowable temperature, the user cannot satisfactorily record an important scene so that the user feels inconvenient. In view of this, the digital camera 100 according to the first embodiment changes the moving image recording mode so that, even if a measured temperature in the case rises, the digital camera 100 can continue moving image recording as long as possible.

Figure 7:
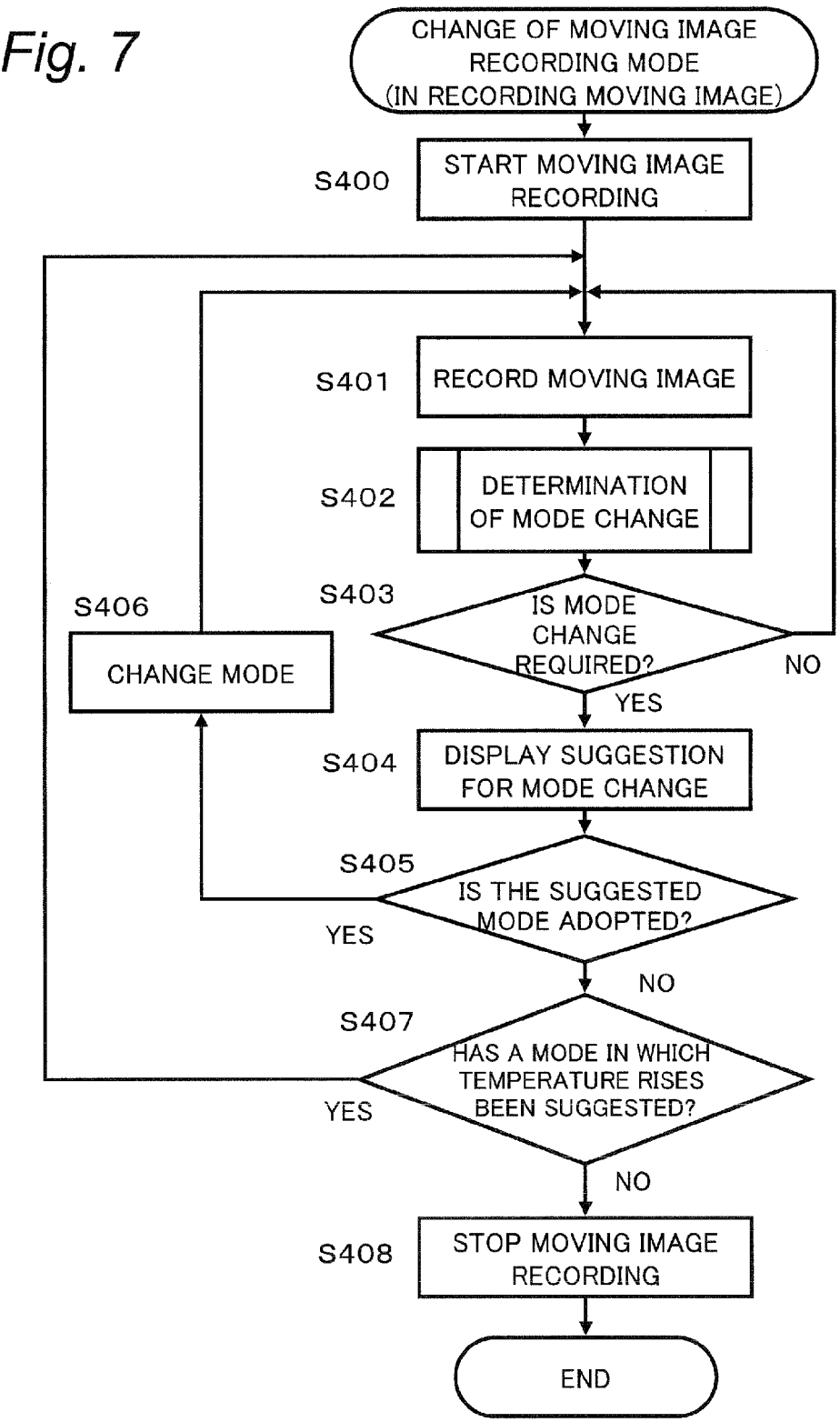
FIG. 7 is a flowchart of an operation of changing the moving image recording mode during moving image recording.

2-1. Operation of Changing Moving Image Recording Mode During Moving Image Recording Operation FIG. 7 is a flowchart showing am operation of changing the moving image recording mode during a moving image recording operation. First, when receiving an operation of pressing the moving image recording button 206 in a recording standby state, the controller 130 starts a moving image recording operation (S400). The moving image recording operation continues until receiving an operation of pressing the moving image recording button 206 again, as long as there are no problems in the temperature in the case, the recording capacity of the memory card 140, the remaining amount of battery, etc. (S401).

During the moving image recording operation (S401), the controller 130 determines whether the moving image recording mode needs to be changed, based on the temperature in the case of the digital camera 100 (S402). Specifically, the controller 130 determines that there is a need to change the moving image recording mode to a mode in which the temperature in the case of the digital camera 100 drops, when the temperature in the case of the digital camera 100 is relatively high (i.e., when the temperature approaches the recording stop temperature). On the other hand, the controller 130 determines that there is a need to change the moving image recording mode to a mode that allows recording with high image quality, when the temperature in the case of the digital camera 100 is relatively low and the digital camera 100 is set to a moving image recording mode in which the temperature does not rise and recording with low image quality is performed. Otherwise, the controller 130 determines that there is no need to change the moving image recording mode. A detail of the determination as to whether to change the moving image recording mode will be described later.

Figure 8:
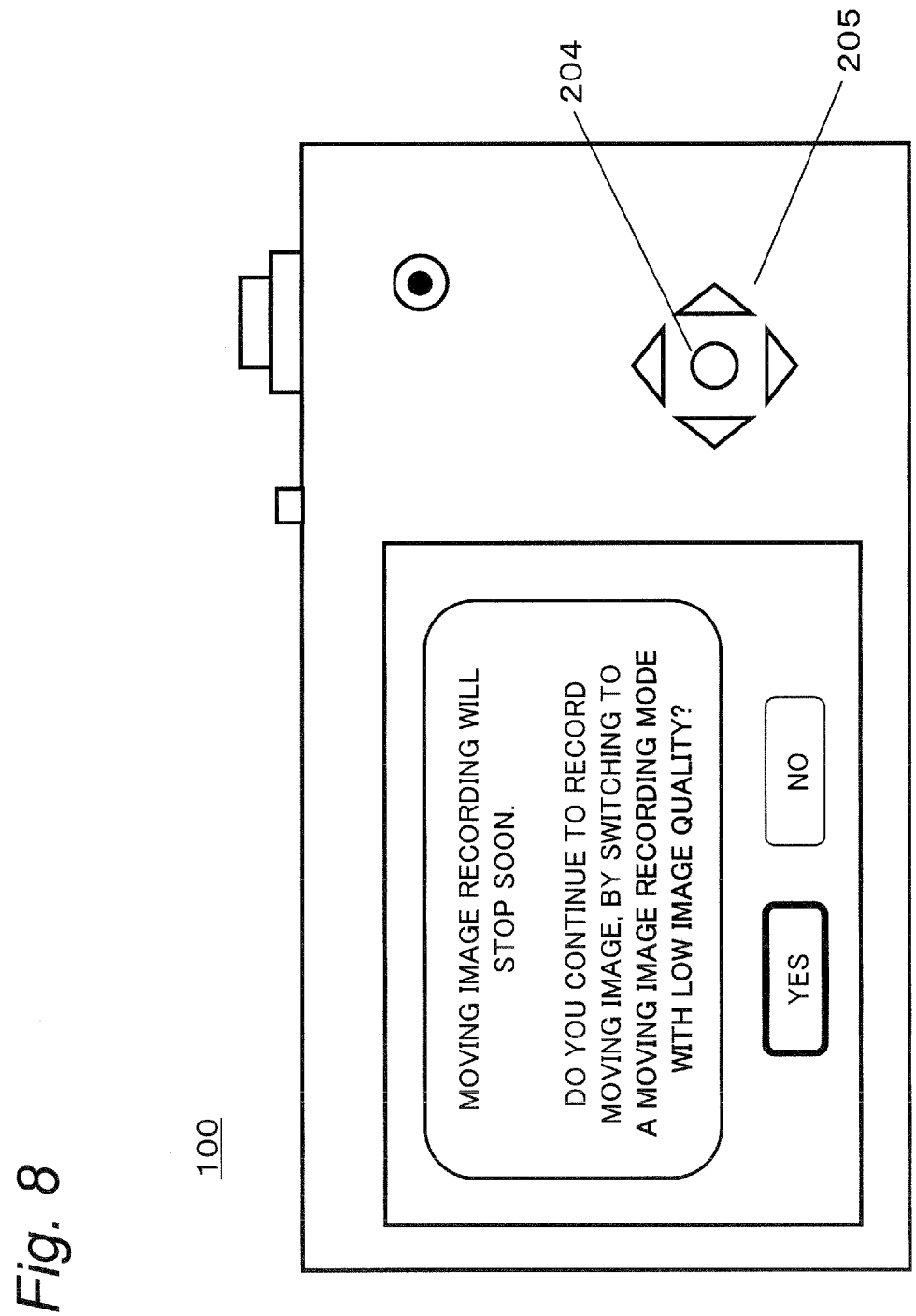
FIG. 8 is a diagram of a screen for suggesting a user to switch the moving image recording mode.

If it is determined in step S402 that there is no need to change the moving image recording mode (NO in S403), then the control by the controller 130 returns to step S401 to continue the moving image recording. On the other hand, if it is determined in step S402 that there is a need to change the moving image recording mode (YES in S403), then the controller 130 performs control to display a screen suggesting the user to change the moving image recording mode on the liquid crystal display monitor 123 (S404). FIG. 8 shows an example of the screen suggesting the user to change the moving image recording mode. As shown in FIG. 8, the liquid crystal display monitor 123 displays a message indicating that the moving image recording stops soon and a message inquiring whether to switch the moving image recording mode to a low image quality moving image recording mode and continue the moving image recording. The user selects either "YES" or "NO" with a left or right key of the cross button 205 and presses the central button 24 to decide the selection.

Subsequently, the controller 130 determines whether the user accepts the suggestion to change of the moving image recording mode (S405). If it is determined that the user accepts the suggestion to change of the moving image recording mode (YES in S405), then the controller 130 changes the moving image recording mode to the suggested moving image recording mode. Then, the operation of the controller 130 returns to step S401. On the other hand, if it is determined that the user does not adopt the suggested moving image recording mode (NO in S405), then the controller 130 determines whether the moving image recording mode suggested in step S404 is a moving image recording mode (the first or second moving image recording mode) in which the temperature rises (S407).

If the suggested moving image recording mode is a moving image recording mode in which the temperature rises (YES in S407), then the operation of the controller 130 returns to step S401 to continue the moving image recording. Since the user does not adopt the suggestion to change the moving image recording mode to a mode in which the temperature rises, the controller 130 is being set to a moving image recording mode in which the temperature does not rise. In this case, even if the moving image recording operation continues, the temperature in the case does not reach the recording stop temperature and thus control is performed such that the moving image recording continues in the same moving image recoding mode.

On the other hand, if the suggested moving image recording mode is not a moving image recording mode in which the temperature rises (NO in S407), then the controller 130 stops the moving image recording operation (S408). Although a suggestion is made to change the moving image recording mode to a mode in which the temperature does not rise (i.e., a moving image recording mode in which the temperature drops (the third or fourth moving image recording mode)), when the suggestion is not adopted, the temperature in the case may eventually reach the recording stop temperature. Hence, in order to prevent the temperature in the case from reaching the recording stop temperature, the control to stop the moving image recording operation is conducted.

2-1-1. Process of Determining Whether to Change the Moving Image Recording Mode

Figure 9:
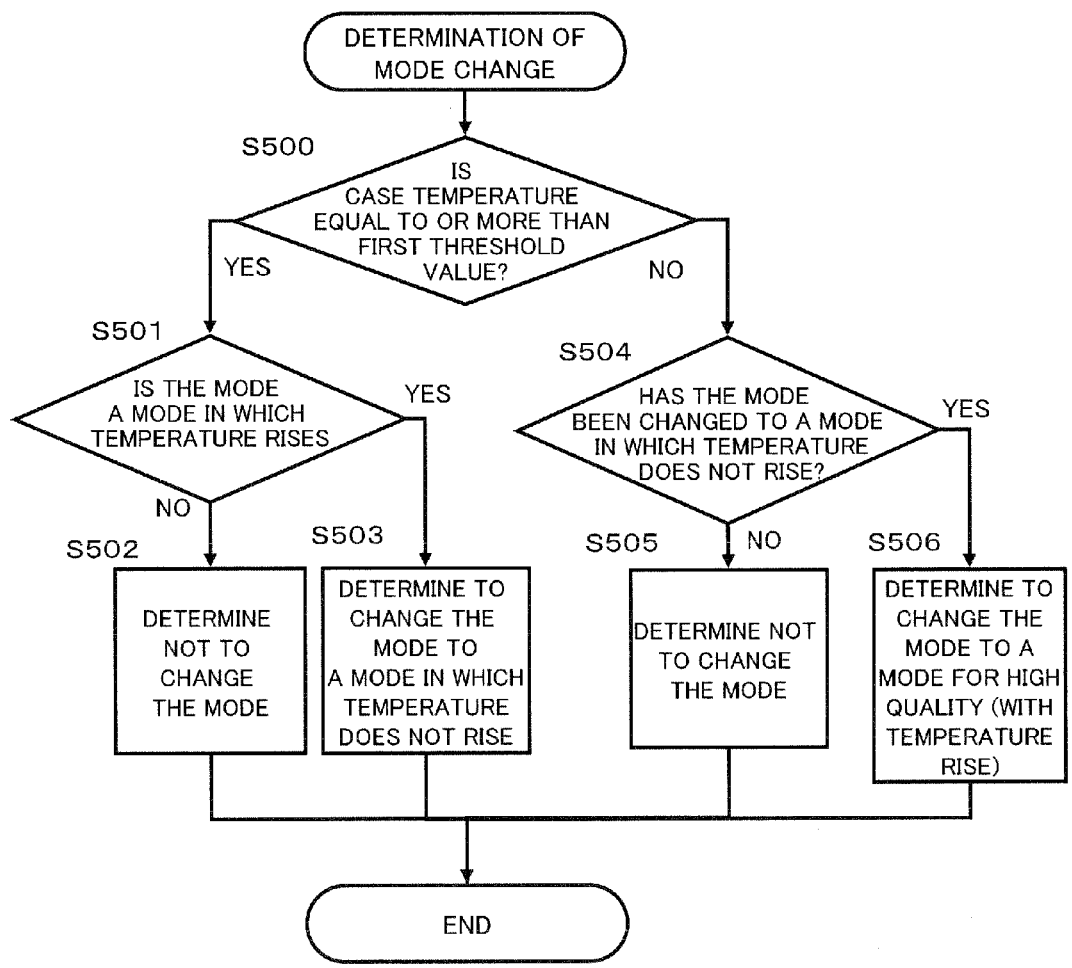
FIG. 9 is a flowchart of an operation of determining whether to change the moving image recording mode.

Next, a detail of a process of determining whether to change the moving image recording mode in step S402 will be described. FIG. 9 is a flowchart of a process of determining whether to change the moving image recording mode.

First, the controller 130 determines whether the temperature in the case of the digital camera 100 is higher than or equal to the warning temperature (first threshold value) (S500). If the temperature in the case is higher than or equal to the warning temperature (YES in S500), then the controller 130 determines whether the moving image recording mode being currently set is a moving image recording mode in which the temperature rises (a moving image recording mode with a high temperature rise rate) (S501).

If the moving image recording mode being currently set is not a moving image recording mode in which the temperature rises (NO in S501), then the controller 130 determines not to change the moving image recording mode (S502). This is because when the moving image recording mode being currently set is not a moving image recording mode in which the temperature rises, even if the moving image recording operation continues, the temperature in the case has no chance of reaching the recording stop temperature, and thus it is considered that a mode change is not necessary.

On the other hand, if the moving image recording mode being currently set is a moving image recording mode in which the temperature rises (YES in S501), then the controller 130 determines to change the moving image recording mode (S503). That is, the controller 130 determines to change the moving image recording mode to a mode in which the temperature does not rise. This is because when the recording operation continues in a moving image recording mode in which the temperature rises, the temperature in the case may eventually reach the recording stop temperature and thus, by changing the moving image recording mode to a mode in which the temperature does not rise, a drop in temperature in the case can be expected. In this case, the moving image recording mode may be changed to either the third or fourth moving image recording mode, but it is preferable to change to the third moving image recording mode with higher image quality.

Meanwhile, in the determination in step S500, if the temperature in the case is lower than the warning temperature (first threshold value) (NO in S500), then it is determined whether the currently set moving image recording mode is a mode in which the temperature does not rise and which has been changed in a loop process of the operation flow process shown in FIG. 7 (S504). Specifically, it is determined whether a moving image recording mode is initially set to a moving image recording mode which records a moving image with high image quality but causes the temperature rise, and then it is changed to a moving image recording mode (the third or fourth moving image recording mode) which records a moving image with low image quality but suppresses the temperature rise, according to conditions of the temperature in the case.

If the moving image recording mode has not been changed to a mode in which the temperature does not rise (NO in S504), then the controller 130 determines not to change the moving image recording mode (S505). As an example of this, there is the case in which a moving image recording mode with high image quality (a moving image recording mode in which the temperature rises) is set initially and has not been changed. In addition, the case in which a moving image recording mode with low image quality (a moving image recording mode in which the temperature does not rise) has been set from the beginning is also considered as the example.

If the moving image recording mode has been changed to a mode in which the temperature does not rise in the determination in step S504 (YES in S504), then the controller 130 determines to change the moving image recording mode to a mode in which the temperature rises but the image quality is higher (S506). The reason why such a determination is made is because the current temperature in the case is lower than the warning temperature threshold value and thus it would be considered that there is enough time to reach the recording stop temperature even if the moving image recording mode is changed to a mode with high image quality.

By appropriately controlling the moving image recording mode in view of the temperature in the case of the digital camera 100 in the above-described manner, even if the temperature in the case rises, the moving image recording can be continuously performed as long as possible.

Figure 10:
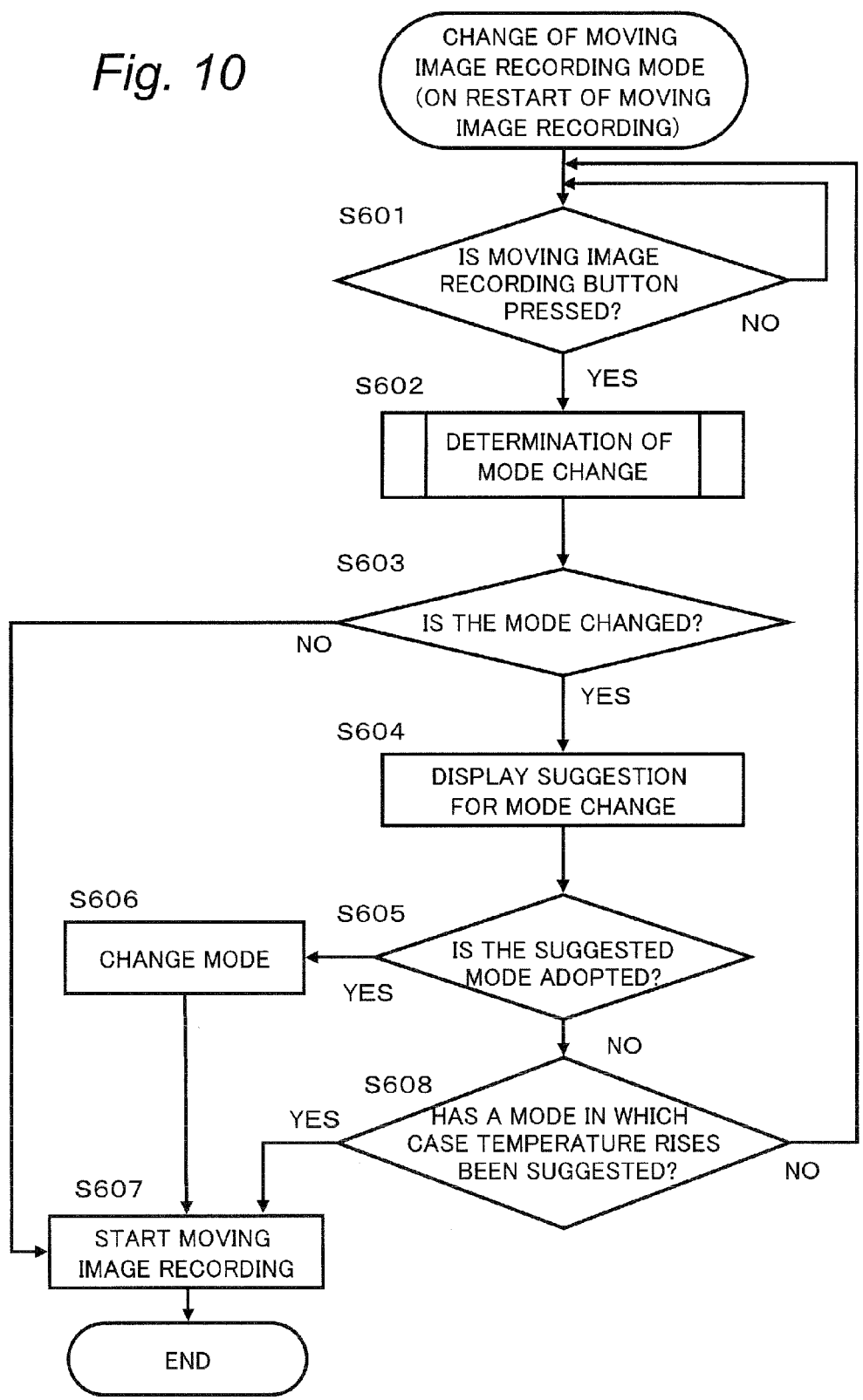
FIG. 10 is a flowchart of an operation of changing the moving image recording mode upon restart of the moving image recording.

2-2. Operation of Changing Moving Image Recording Mode at Restart of Moving Image Recording An operation of changing a moving image recording mode at the restart of the moving image recording will be described. FIG. 10 is a flowchart of the operation of changing the moving image recording mode at the restart of the moving image recording.

The controller 130 monitors whether the moving image recording button 206 is pressed in a recording standby state (S601). If the moving image recording button 206 is pressed by the user (YES in S601), the controller 130 determines whether to change the moving image recording mode (S602). A process of determining whether to change the moving image recording mode at this step S602 is the same as that already described using FIG. 9 (steps S500 to S506) and thus description thereof is omitted here. Note that when stop and start of the moving image recording operation are continuously repeated, there may be a case in which a moving image recording operation starts with temperature of the CCD image sensor 120 and the image processor 122 being high so that the temperature associated with the case at the start of the moving image recording operation would exceed the warning temperature (first threshold value). In such a case, the determination in step S500 in the flowchart in FIG. 9 is "YES". In addition, when a moving image recording mode with high image quality (a moving image recording mode in which the temperature rises) is initially set but thereafter the moving image recoding mode is changed to a mode with low image quality (a moving image recording mode in which the temperature does not rise) at the previous moving image recording operation, the moving image recording mode can be changed again (back) to a mode with high image quality at the restart of the current moving image recording (S506).

If it is determined in step S602 not to change the moving image recording mode (NO in step S603), then the controller 130 starts the moving image recording (S607). If it is determined in step S602 to change the moving image recording mode (YES in step S603), then the controller 130 controls the liquid crystal display monitor 123 to display a suggestion to change the moving image recording mode (S604). The operation in step S604 is the same as that in step S404 and thus description thereof is omitted.

If the suggested moving image recording mode is adopted (YES in S605), then the controller 130 changes the current moving image recording mode to the suggested moving image recording mode (S606). Then, the controller 130 starts the moving image recording (S607).

On the other hand, if the suggested moving image recording mode is not adopted (NO in S605), then the controller 130 determines whether a moving image recording mode in which the temperature associated with the case rises is suggested in step S604 (S608).

If a moving image recording mode in which the temperature associated with the case rises is suggested (YES in S608), then the controller 130 starts the moving image recording operation (S607). The reason for this will be described below. Since the suggested moving image recording mode in which the temperature associated with the case rises is not adopted, the controller 130 is being set to a moving image recording mode in which the temperature in the case does not rise. In this case, even if the moving image recording operation continues, the temperature associated with the case would not reach the recording stop temperature. Thus, the control to start a moving image recording operation is performed.

On the other hand, if a moving image recording mode in which the temperature associated with the case rises is not suggested (NO in S608), then the controller 130 does not start a moving image recording operation but returns to a recording standby state that waits for press of the moving image recording button (S601). The reason for this will be described below. When a moving image recording mode in which the temperature in the case rises is not suggested, a moving image recording mode in which the temperature does not rise is suggested. Hence, when the suggestion is not adopted, the controller 130 is being set to a moving image recording mode in which the temperature in the case rises. In this case, if the moving image recording operation continues, the temperature in the case may eventually reach the recording stop temperature. Thus, in this case, in order to prevent the temperature in the case from reaching the recording stop temperature, the control is performed not to start a moving image recording operation.

As described above, according to the digital camera 100 of the present embodiment, during the moving image recording and at the restart of the moving image recording, the controller 130 can set a suitable moving image recording mode according to the temperature in the case, in view of the temperature rise rate for each moving image recording mode. This arrangement enables the moving image recording to be performed as long as possible, even if the temperature in the case of the digital camera 100 rises.

3. Summary

As described above, a digital camera 100 according to the first embodiment includes a temperature sensor 161 that senses a temperature associated with or in a case of the digital camera 100, a combination of a CCD image sensor 120, an image processor 122, and a controller 130 (hereinafter, referred to as a "moving image recording unit") that generates moving image data based on one of a plurality of moving image recording modes and records the moving image data in a memory card 140, the moving image recording modes being for determining image quality of a recording image, and the controller 130 that controls a moving image recording mode which is to be set on the moving image recording unit. The controller 130 changes the moving image recording mode to be set on the moving image recording unit, according to a result of the sensing by the temperature sensor 161. By this configuration, the digital camera 100 can appropriately control a moving image recording mode to be set on the moving image recording unit, in view of the temperature associated with the case. Accordingly, even if the temperature in the camera rises, the moving image recording can be continuously performed as long as possible.

In addition, in the digital camera 100 according to the first embodiment, the controller 130 changes the moving image recording mode to be set on the moving image recording unit, according to the result of the sensing by the temperature sensor 161, during a recording operation of a moving image data by the moving image recording unit. By this, the digital camera 100 can control a moving image recording mode to be set on the moving image recording unit, in view of a result of sensing of a temperature associated with the case during a recording operation of a moving image data. Accordingly, the digital camera 100 can continue the recording operation of the moving image data in view of the temperature in the case.

In addition, in the digital camera 100 according to the first embodiment, the controller 130 changes the moving image recording mode to be set on the moving image recording unit, according to the result of the sensing by the temperature sensor 161, when the moving image recording unit starts a moving image data recording operation. By this, the digital camera 100 can control a moving image recording mode to be set on the moving image recording unit, taking into account a result of sensing of a temperature associated with the case at the start of a moving image data recording operation. Accordingly, the digital camera 100 can start a recording operation of a moving image data taking into account a result of sensing of a temperature associated with the case.

In addition, in the digital camera 100 according to the first embodiment, the controller 130 dynamically changes a moving image recording mode. By this, the digital camera 100 can dynamically change a moving image recording mode taking into account a result of sensing of a temperature associated with the case.

In addition, in the digital camera 100 according to the first embodiment, the controller 130 may provide, before changing the moving image recording mode, an indication suggesting a user to change the moving image recording mode on a liquid crystal display monitor 123. By this, the digital camera 100 can suggest the user to change the moving image recording mode before changing the moving image recording mode taking into account a result of sensing of a temperature associated with the case, so that the user can grasp in advance the change before the moving image recording mode is changed.

4. Other Embodiments

An embodiment is not limited to the above-described first embodiment and various other embodiments are considered. Other embodiments will be summarized below.

Although in the above-described embodiment the CCD image sensor 120 is described as an example of an imaging device, the idea of the above-described embodiment is not limited thereto. Specifically, the imaging device may be other imaging devices such as a CMOS image sensor and an NMOS image sensor.

In the above-described embodiment, the controller 130 displays a suggestion to change the moving image recording mode on the liquid crystal display monitor 123 (S404 in FIG. 7 and S604 in FIG. 10) and determines whether the suggested moving image recording mode is adopted by the user (S405 in FIG. 7 and S605 in FIG. 10). Instead of such control, the following control may be performed. Specifically, when it is determined to change the moving image recording mode (S402 in FIG. 7 and S602 in FIG. 10), the controller 130 may automatically change the moving image recording mode without providing the suggestion to change the moving image recording mode.

Note that the idea of the above-described embodiment can be applied to both a camera with a built-in lens and a lens-interchangeable camera. Note also that the idea of the above-described embodiment can be applied to an imaging apparatus capable of recording a moving image, such as a movie camera and an information terminal with a camera, in addition to a digital camera.

INDUSTRIAL APPLICABILITY

The above embodiment is useful for imaging apparatuses capable of recording moving images, such as digital cameras, movie cameras, and information terminals with a camera.

What is claimed is:
1. An imaging apparatus comprising:
 a temperature sensor configured to sense a temperature associated with a case of the imaging apparatus;
 a moving image recording unit configured to generate moving image data based on one of a plurality of recording methods which determines image quality of a recording image, and records the moving image data in a recording medium; and
 a controller configured to control the recording method set on the moving image recording unit, wherein
 the controller changes the recording method to be set on the moving image recording unit, according to a result of the sensing by the temperature sensor.

2. The imaging apparatus according to claim 1, wherein the controller changes the recording method to be set on the moving image recording unit according to the result of the sensing by the temperature sensor, during a recording operation of a moving image data by the moving image recording unit.

3. The imaging apparatus according to claim 1, wherein the controller changes the recording method to be set on the moving image recording unit according to the result of the sensing by the temperature sensor, when the moving image recording unit starts a recording operation of moving image data.

4. The imaging apparatus according to claim 1, further comprising a display unit, wherein
the controller controls the display unit to provide an indication suggesting a user to change the recording method, before changing the recording method.

5. The imaging apparatus according to claim 2, wherein the controller changes the recording method to be set on the moving image recording unit according to the result of the sensing by the temperature sensor, when the moving image recording unit starts a recording operation of moving image data.

6. The imaging apparatus according to claim 2, further comprising a display unit, wherein
the controller controls the display unit to provide an indication suggesting a user to change the recording method, before changing the recording method.

7. The imaging apparatus according to claim 3, further comprising a display unit, wherein
the controller controls the display unit to provide an indication suggesting a user to change the recording method, before changing the recording method.

8. An imaging apparatus comprising:
an imaging portion for generating a moving image based upon a subject image and recording the moving image in a recording medium, the imaging portion generating the moving image in accordance with an operation mode of the imaging apparatus;
an output unit;
a temperature sensor configured to measure a temperature associated with the imaging apparatus;
a controller coupled to the output unit, the imaging portion and the temperature sensor; and
a memory storing instructions for configuring the controller, wherein the instructions configure the controller to:
set the operation mode of the imaging apparatus to one of a a plurality of recording modes, wherein each of the plurality of recording modes has different temperature characteristics associated with the imaging apparatus;
determine if the operation mode of the imaging apparatus should be changed to a different operation mode in which the temperature associated with the imaging apparatus will drop based upon the set operation mode and measured temperature; and
control the output unit to provide an indication suggesting a user to change the recording method when determined that the operation mode should be changed.

* * * * *